United States Patent
Cabrera

[11] Patent Number: 5,868,413
[45] Date of Patent: Feb. 9, 1999

[54] UNICYCLE HAVING REARWARDLY MOUNTED HANDLE STRUCTURE FOR TRAINING RIDERS

[76] Inventor: Carlos Parra Cabrera, Calle Pio Baroja No. 5 Colonia De San Andres Colmenar Viejo, 25770 Madrid, Spain

[21] Appl. No.: 588,622

[22] Filed: Jan. 19, 1996

[51] Int. Cl.[6] ............................. B62H 1/12; B62K 1/00
[52] U.S. Cl. ..................... 280/205; 280/275; 280/47.2
[58] Field of Search ........................ 280/275, 205, 280/266, 278, 47.2, 47.16, 276, 293, 78, 47.32; D12/107

[56] References Cited

U.S. PATENT DOCUMENTS

| | | | |
|---|---|---|---|
| 87,355 | 3/1869 | Myers | 280/205 |
| 242,161 | 5/1881 | Scuri | 280/205 |
| 246,031 | 8/1881 | Otto | 280/205 |
| D. 273,287 | 4/1984 | Evans | D12/107 |
| 524,019 | 8/1894 | Desmond | 280/205 |
| 550,399 | 11/1895 | Anderson | 280/205 |
| 572,941 | 12/1896 | Munro | 280/205 |
| 3,437,351 | 4/1969 | Newbern | 280/205 |
| 4,746,132 | 5/1988 | Eagan | 280/266 |
| 5,310,203 | 5/1994 | Chen | 280/275 |
| 5,454,579 | 10/1995 | Chen | 280/205 |
| 5,509,831 | 4/1996 | Gelbart | 440/27 |

FOREIGN PATENT DOCUMENTS

| | | | |
|---|---|---|---|
| 2-128981 | 5/1990 | Japan | 280/205 |

*Primary Examiner*—J. J. Swann
*Assistant Examiner*—Gary Savitt
*Attorney, Agent, or Firm*—Thomas A. O'Rourke

[57] ABSTRACT

An improved unicycle is disclosed. The unicycle has a forked stem with a pair of tines. A wheel is rotatable mounted on the tines and a seat is connected to the stem. The stem has a first rod extending rearwardly from the stem and a second rod at the end of the first rod opposite the stem. The second rod extends in a direction transverse to the wheel direction of travel and generally parallel to the axle of the unicycle. The second rod has handle at each of the first and second ends.

14 Claims, 6 Drawing Sheets

UNICYCLE HAVING REARWARDLY MOUNTED HANDLE STRUCTURE FOR TRAINING RIDERS

BACKGROUND OF THE INVENTION

Wheeled vehicles propelled by foot power have been known for many years. In fact, self propelled bicycles have been available for nearly two hundred years. Initially, bicycles had only a frame and front and rear wheels and were propelled by pushing with the rider's feet against the ground. Improvements have been made in bicycles over the years. These improvements have included pneumatic tires for a more comfortable ride, pedals that turn one of the wheels, a drive chain and sprockets that powers the rear wheel, coaster brakes and hand brakes and countless other modifications to facilitate the ease and comfort of riding.

While bicycles have achieved considerable popularity over the years, bicycle's cousin the unicycle has not been as successful. A number of reasons may be postulated for the unicycle's lesser popularity compared to the bicycle. One of the primary reasons is that unicycles are not particularly easy to learn to use. Many children are introduced to tricycles at a very early age. The stability of the three wheels permits the rider to operate the vehicle needing only the ability to pedal. Children subsequently graduate to a "two wheeler", that is, an ordinary bicycle that has been stabilized by the addition of a pair of "training wheels" to the rear wheel. As the child matures, an age is reached, usually at about 5 years, when the child has developed sufficient motor skills and balance that the training wheels may be removed and a bicycle can be operated readily with only two wheels. Even so, for the initial few times a child uses a bicycle a parent or other adult's assistance is required to provide some balance and support until the child polishes his skills and makes the transition to the bicycle without training wheels.

Although unicycles have been around nearly as long as bicycles, unicycles are considerably more difficult to master. In riding a bicycle the balance that is needed is, generally, a side to side balance. Front to rear or fore and aft balance is provided by the pair of wheels. Unicycles, on the other hand, beside requiring the side to side balance of a bicycle also require front and rear balance. Anyone who has watched a person learning to ride a unicycle will attest to the difficulty in mastering the balance that is needed. Because fore and aft balance is necessary, the rider must be careful so that he is not pitched forward or backward while maneuvering. In view of the greatly increased balancing that must be learned and the required training time needed before one can satisfactorily handle a unicycle many potential users become frustrated by the difficulty. Compounding the problem is the amount of time the rider needs the assistance of an aide to help balance the unicycle during the learning process. Since assistance is needed for longer periods of time this makes it more difficult for the new rider to practice. Even after the training period has been completed, unicycle riders must concentrate more when riding the unicycle then ordinary bicycle riders to preserve balance. Frequently, a unicycle rider must move constantly and quickly to preserve balance when the unicycle is moving slowly.

Unicycles are also popular in many entertainment activities particularly circuses and variety shows. While unicycle riding is popular among viewers of these events, in many shows, the riding is limited to generally flat surfaces except for only the most advanced riders who have achieved great skill. The ability to go up and down steps and over separations in the riding surface such as a shallow crevasse or over obstacles placed in the path of travel is generally limited to highly experienced riders.

Unicycles can also be used for transportation or commuting by their owners. Unicycles, being much more compact than bicycles have an advantage in many urban settings. Frequently bicyclists must chain their bicycles to fences, poles and other available means to prevent theft. Unicyclists, however, can more readily bring their unicycle into an office in lieu of locking it outside thus reducing the risk of loss or damage from passersby or the weather.

The prior art discloses a number of designs for unicycles that claim to provide ease of use. For example U.S. Pat. No. 3,427,351 discloses a unicycle with a training attachment which is comprised of a length of generally S-shaped metal tubing which is positioned over the wheel and in the plane defined by the wheel. The forward end of the tubing is turned upwardly to provide a handle portion in front of the seat. The remaining length of the tubing extends rearwardly and downwardly around the wheel to the level of the axle and then extends straight down to a distance above ground level to provide a support portion. A caster or other wheel may be provided on the end of the support portion.

U.S. Design Pat. No. 273,287 discloses a unicycle having a frame with a fork stem with a forwardly and upwardly extending tube or rod which is provided with a pair of handle bars at the terminating end of the tube.

It is an object of the present invention to provide a unicycle that is easy to learn to use and which provides the user with increased stability and balance.

It is also an object of the present invention to provide an improved unicycle where even riders with moderate experience using the unicycle can perform acrobatic type maneuvers with the unicycle such as travelling up and down stairs and jumping over obstacles in the path of travel.

It is a further object of the invention to provide a unicycle that is particularly adapted for travel or commuting since it is designed to be structurally strong when assembled yet may be readily disassembled to permit it to be stored and/or carried on for example buses, subways and other modes of transportation.

SUMMARY OF THE INVENTION

The present invention is directed to an improved unicycle which permits beginning users to quickly learn the skills necessary to balance and ride the unicycle. In addition, the unicycle of the present invention permits more advanced users to perform some of the more complex maneuvers that are usually only possible where the riders are highly experienced with the prior art unicycles. There is also provided a unicycle that is capable of being readily disassembled into its component sections yet capable of being reassembled where it retains considerable structural strength. The improved unicycles of the present invention is accomplished by a unicycle having a forked stem for mounting a wheel. This wheel is provided with a pneumatic tire on a rim which is usually spoked. On the upper end of the forked stem there is provided a cushioned seat with a generally concave cross-section. Extending rearwardly from the forked stem is a tube or rod. This rearwardly extending rod may be 4 to 8 inches in length and extends upwardly at an angle of less than 90° and usually less than 45° measured from a plane parallel to the plane of the ground or riding surface. On the rod or tube is attached a second rod or tube which extends in a direction generally transverse or perpendicular to the direction of the first rod or tube. The second rod or tube is preferably circular in cross section and has generally a "U"

shape and having a length of about 2–3 feet. This second transverse rod or tube is provided with a handle at each end. The handles preferably extend forwardly from the second rod toward the front of the unicycle. The arrangement of the handles on the unicycle provides a unicycle that has an unusual degree of stability for the rider and permits the rider to quickly acquire the necessary skills for using a unicycle but also permits the more advanced rider to perform maneuvers that heretofore were extremely difficult such as riding up and down stairs and jumping over obstacles.

DETAILED DESCRIPTION OF THE INVENTION

Figure 1:
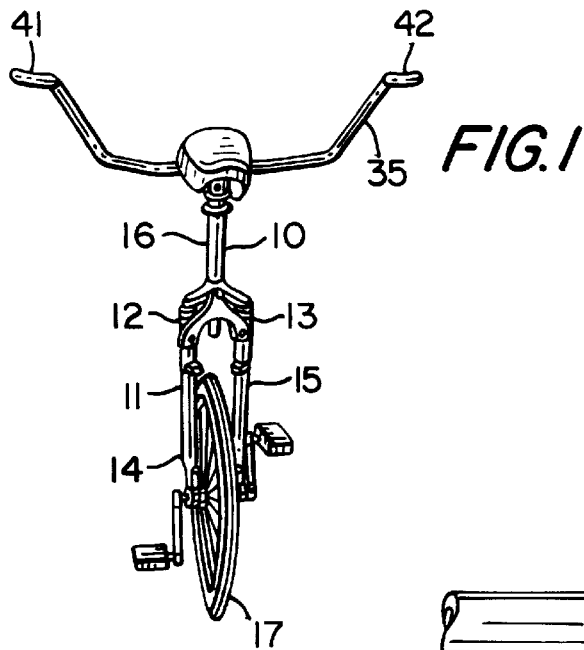
FIG. 1 is a front view of the unicycle of the present invention.
Figure 4:
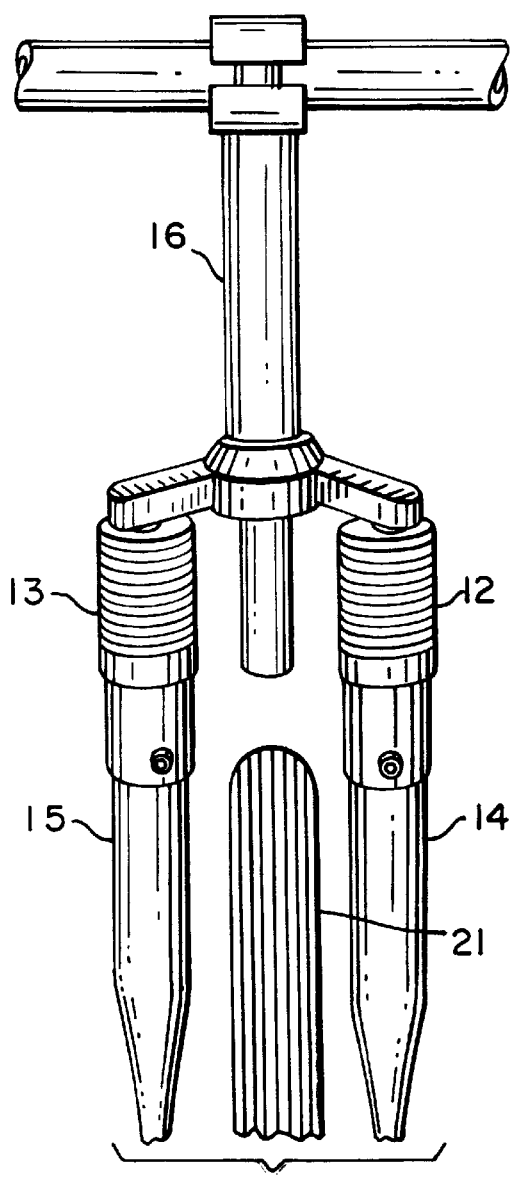
FIG. 4 is a partial front view of the stemmed fork of the frame of the unicycle.
Figure 3:
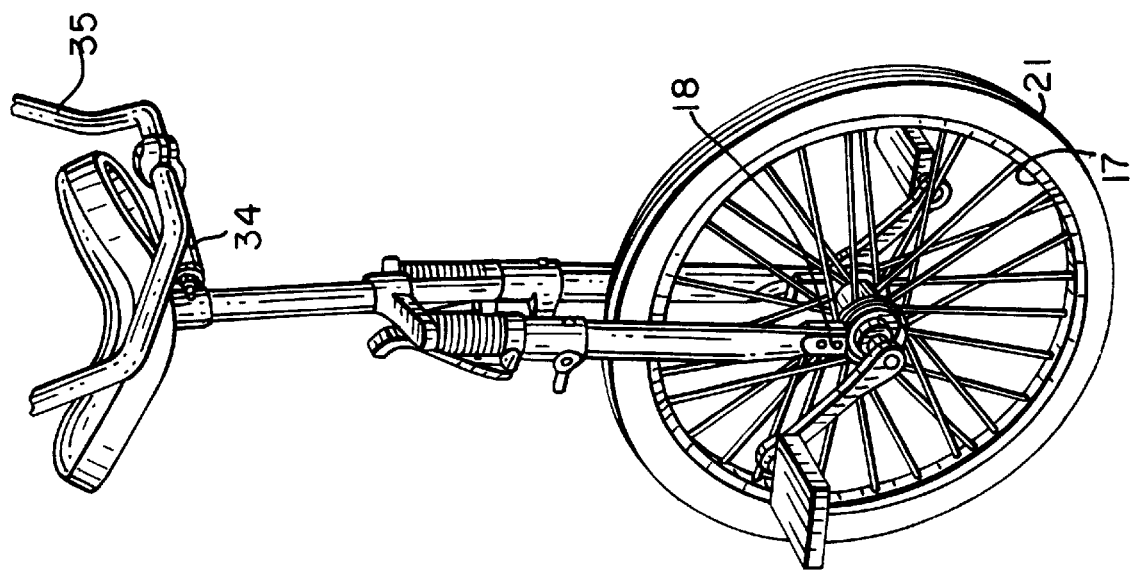
FIG. 3 is an enlarged partial side view of the unicycle of the present invention.

FIG. 1 shows a unicycle 10 having a fork stem 11. The fork stem 11 is provided with a pair of tines 14 and 15 which extend from the stem 16 and to which the axle of a wheel 17 is removably attached. On the tines is provided a shock reducing means which provide comfort for the user. As shown in FIG. 1 shock absorbers 12 and 13 may be used as the shock absorbing means. Preferably the shock absorbs may be an oil hydraulic system with a spring shaped plastic cover. Alternatively metal springs can also be used. The tine ends 18 and 19 of the stem are provided with a means for receiving the axle 20 of the wheel 17. Wheel 17 may be spoked or with a solid center if desired. Advertising or other suitable message can appear in this area, particularly if the area between the axle and the rim is solid instead of spoked. The wheel 17 is usually provided with a pneumatic tire 21. In one embodiment the means for receiving the axle 16 at the tine ends of the stem may be a notch cut out or formed on each end which receives the axle of the wheel. The axle may have a threaded area near each end and the axle may be held to the tine by a nut or other suitable retaining means. On each end of the axle there is provided a pedal assembly 22, 23 which provides motion to the unicycle when rotated. The pedals on the pedal assembly are designed to rotate about their individual axis 24 and 25 as well as around the axis of wheel 17. If desired a fender (not shown) may be provided over the wheel to protect the rider from water spraying on the rider as the wheels turn over wet roads and through puddles.

Figure 7:
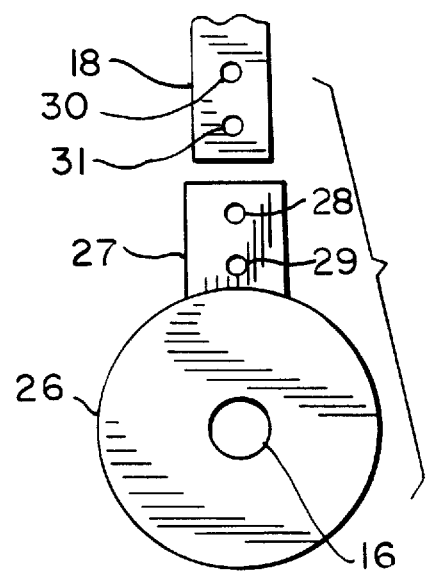
FIG. 7 is an exploded view of the connection of the wheel to the tines of the forked stem.
Figure 8:
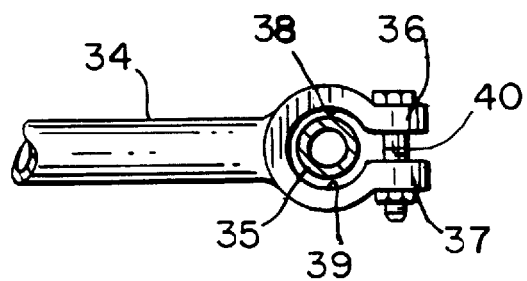
FIG. 8 is a side view of the connection of the second rod to the first rod.

In a preferred embodiment shown in more detail in FIG. 7 the wheel's axles may be connected to each of the tine ends by a disk 26 having a tongue 27 which contains a pair of orifices 28 and 29 which mate with orifices 30 and 31 on each of ends 18 and 19 the tine. The orifices in the stem and the tongue receive suitable fastening means such as bolts or screws which hold the tine ends to the wheel's axle. This embodiment produces a unicycle that can be readily disassembled by the rider with a minimum of tools. When reassembled the unicycle still has considerable stability and strength.

The upper end of the forked stem 33 is provided with a seat 32. The seat may be removable and adjustable to different heights to accommodate riders of different heights. The seat usually has a stem extending from the underside of the seat which enters an orifice in the upper surface of the forked stem. A suitable retaining means may be used to hold the seat stem in place.

The seat 32 may be of any configuration. However, it has been found that a seat having a generally concave cross section provides additional stability to the unicycle and aids in the balancing of the device by the rider. Accordingly the seat is preferably higher in the front and rear then in the center.

Figure 10:
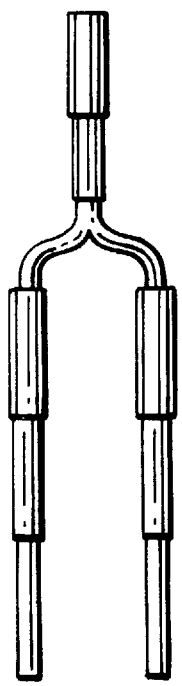
FIG. 10 is a front view of the forked stem of the present invention that is collapsible.
Figure 11:
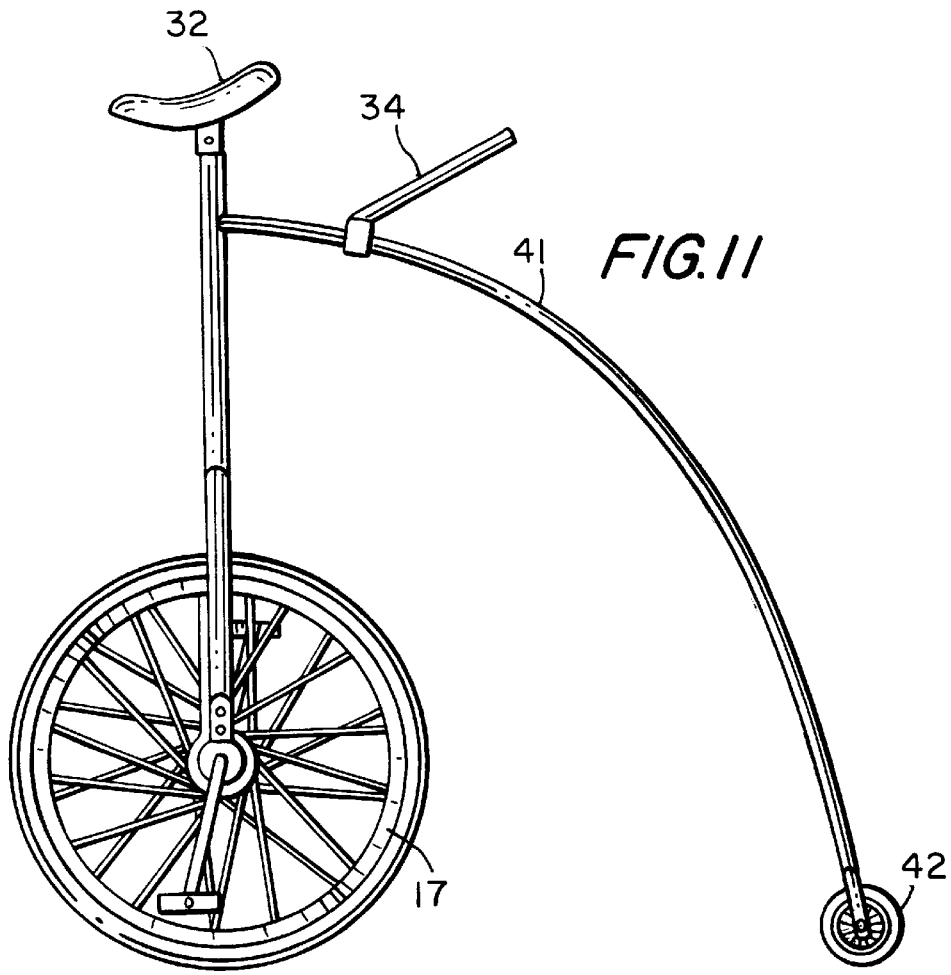
FIG. 11 is a partial view showing a stabilizer connected to the first rod.
Figure 12:
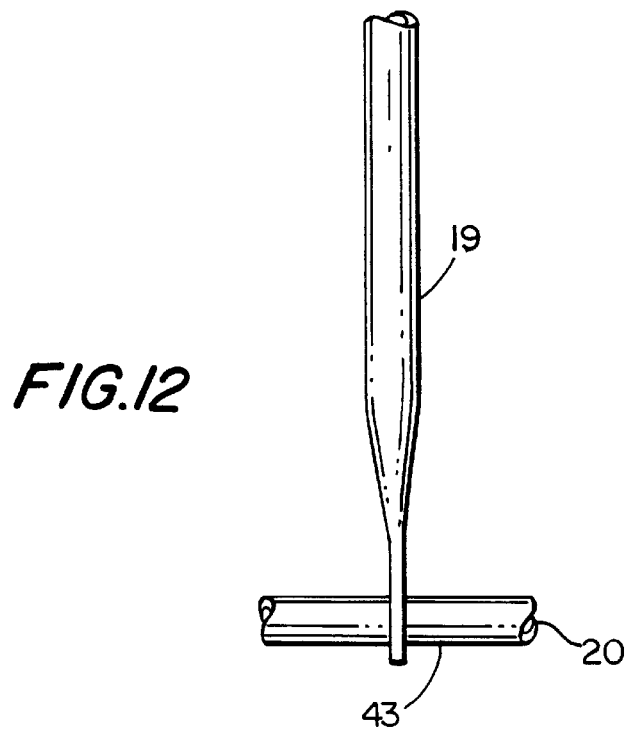
FIG. 12 is a partial view of the connection of a stabilizer bar to the axle of the wheel.

The forked stem is preferably tubular in cross section and made of a light weight but strong metal such as aluminum. Light weight alloys used in aircraft construction are particularly preferred since they are light weight but strong. In one embodiment as shown in FIG. 10 the forked stem including the tines may telescope to reduce the size of the forked stem for ease of handling in a disassembled state. When the forked stem telescopes it is preferred that there be a locking means to hold the portions of the forked stem in an expanded configuration so that the forked stem does not unexpectedly collapse during use. A bayonet type connection is preferred. As seen in FIG. 10 each successive section of the stemmed fork is narrower in cross section than the one above it. Once the locking means is released the sections telescope to reduced size. Preferably, there is a locking means to keep the forked stem in its telescoped configuration.

Extending rearwardly from the upper ends of the forked stem and from just below the seat there is a first rod or a tube 34 preferably similar in construction to the forked stem. The rod or tube 34 can be connected to the forked stem by any suitable means such as for example solder or welding. Alternatively the rod or tube may be removable. If removable there should be a locking means such as a bayonet type connection to facilitate ease of removing yet producing sufficient lock. At the end of the rod or tube opposite the connection to the forked stem there is a second rod or tube 35. The first rod or tube extends rearwardly from the forked stem and upwardly at an angle preferably less than about 75° more preferably less than about 45°. The first rod is generally about 4' to 12' in length. The second rod or tube extends outwardly in a direction generally transverse to the direction of travel of the unicycle. The second rod is connected to the first rod, at about the midpoint of the second rod. In a preferred embodiment end of the first rod or tube is separated into two sections 36 and 37 the inner surface of each 38 and 39 being configured to the outside shape of the second rod 35 that is generally concave on their inner surfaces so that they conform generally to the shape of the outer circumference of the second rod. A suitable fastening means 40 may be used to tighten the two sections of the forked stem to the rod. Similarly, the first rod could be attached to the forked stem in the same manner.

At the ends of the second rod or tube opposite the forked stem handles 41 and 42 are provided. The handles generally extend from the second rod toward the front of the unicycle in a direction generally parallel to said wheels. It should be noted that it has been found that increased stability in riding the unicycle is achieved by the use of a handles in the location shown in the drawings particularly where the height of the handles are at or about the height of the waist of the rider. This arrangement provides the rider with substantially greater balance than is achieved with unicycles which do not have handles or the handles are not in the location of the present invention. Thus, when riding the unicycle the riders arms extend downwardly in generally the same plane as the trunk of the rider and do not extend in a forward or rear direction to any great degree.

Figure 2:
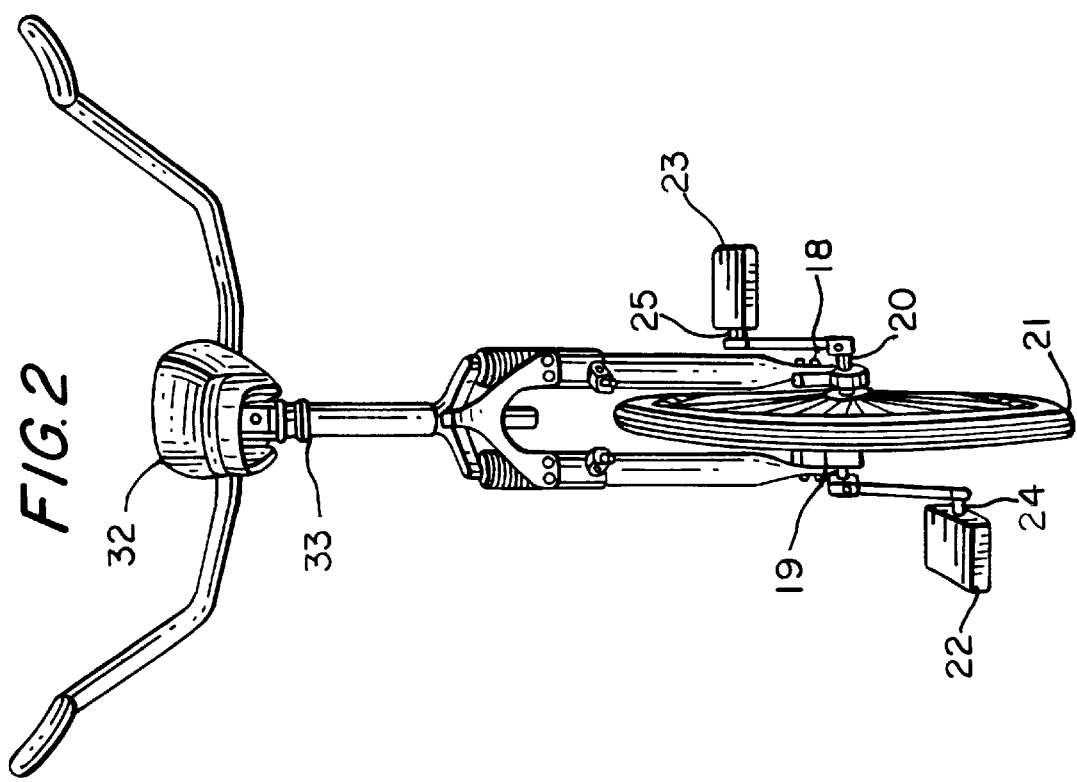
FIG. 2 is a partial front view of the unicycle of the present invention.
Figure 5:
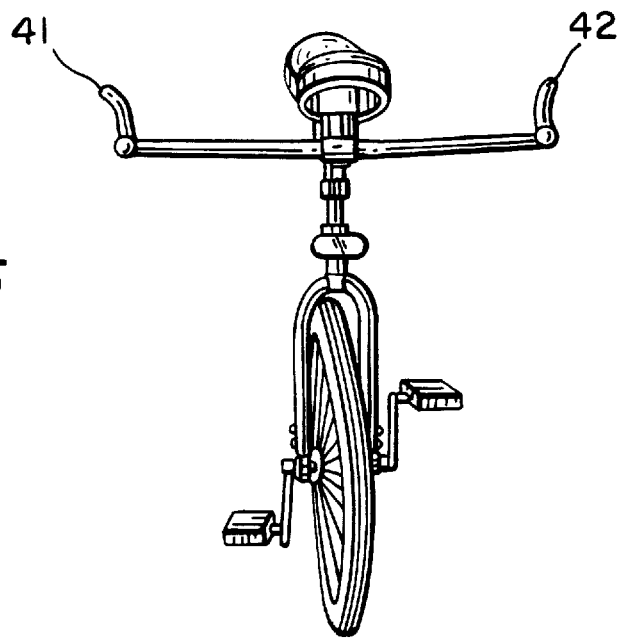
FIG. 5 is a rear view of a unicycle having an alternate embodiment of the handle bar arrangement of the unicycle of the present invention.
Figure 6:
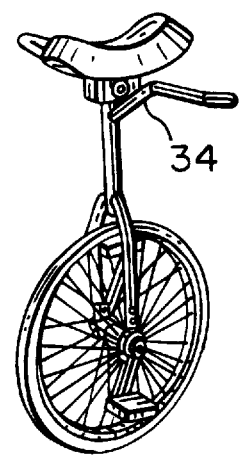
FIG. 6 is a side view of the unicycle of FIG. 5.

As shown in FIGS. 1 and 2 the second rod extends outwardly from the first rod and has a generally "u" shaped configuration. In an alternate embodiment shown in FIGS. 5 and 6 the second rod can be generally straight.

Figure 9:
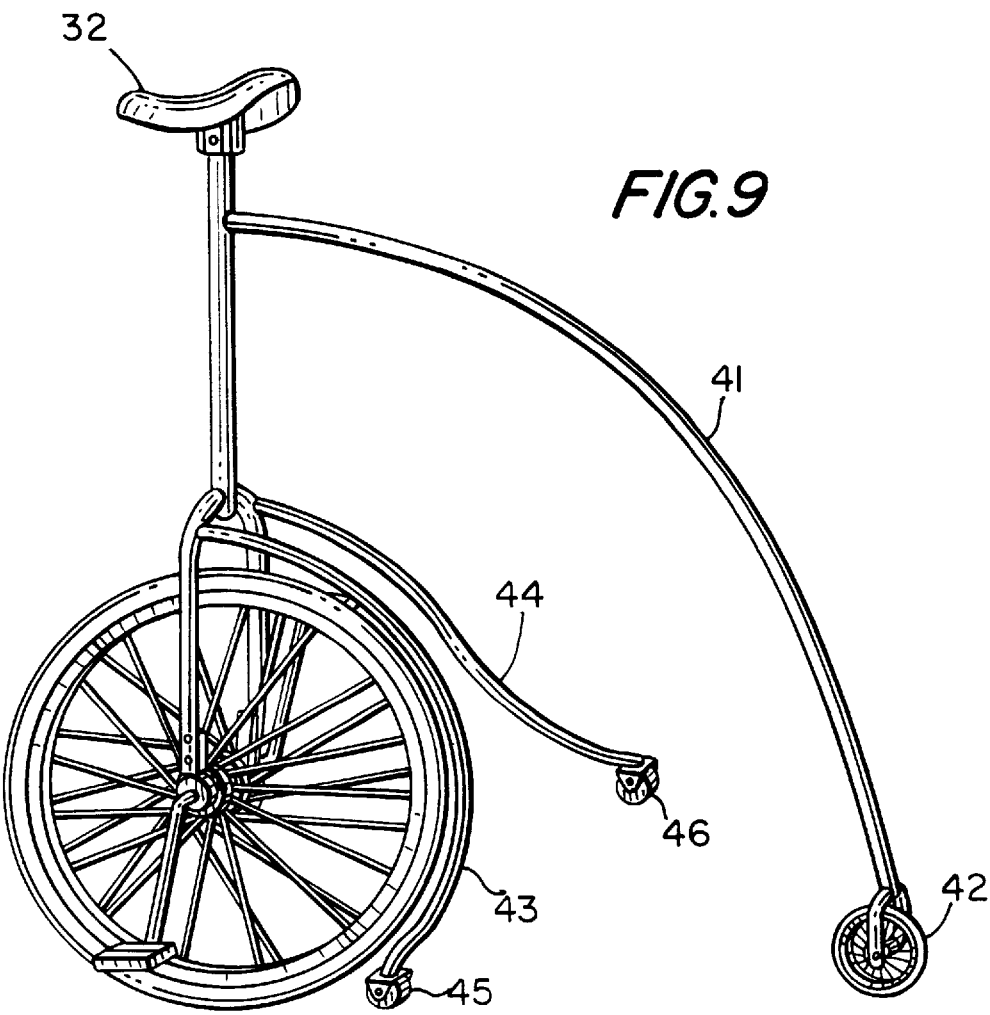
FIG. 9 is a side view of the unicycle of the present invention showing attachment to easy the learning process of riding a unicycle.

As shown in FIG. 9 various attachments may be included to assist the novice rider in learning how to use the unicycle. Attached to the first rod where it connects to the second rod is a fore and aft stabilizer 41. The fore and aft stabilizer is a rod that extends in preferably an arc downwardly and ends in a wheel 42. To stabilizing the unicycle from side to side motion during training stabilizing bars 43 and 44 can be added. The stabilizing bars extend from the stemmed fork or the axle and approach the riding surface or ground level. Preferably these stabilizer bars are not long enough to touch the ground when the unicycle is in a upright position and only come in contact with the ground when the unicycle is tilted toward one side or the other. Preferably the stabilizer bars have a wheeled lower surface 45 and 46 where the stabilizer bar contacts, the ground.

I claim,:

1. An improved unicycle comprising a forked stem having a pair of tines, a wheel rotatably mounted on said tines, a seat connected to said stem and further comprising a first rod having a pair of ends, one end being connected to said stem and extending rearwardly and upwardly from said stem at an angle of less than 90° and a second rod at the other end of the first rod opposite said stem, said second rod extending in a direction generally parallel to the axle of said unicycle said rod having a handle on each of said first and second ends, said handles extending toward the front of said unicycle generally transverse to said axle and wherein said first rod has connected thereto a fore and aft stabilizer, said stabilizer, having a wheel at the end that contacts a riding surface.

2. The unicycle according to claim 1 wherein said first rod extends upwardly from forked stem at an angle of less than 75°.

3. The unicycle according to claim 1 wherein said seat has a concave upper surface.

4. The unicycle according to claim 1 wherein said second rod is generally "u" shaped.

5. The unicycle according to claim 1 wherein each of said tines has a shock absorber.

6. The unicycle according to claim 1 wherein said first rod has a pair of members between which the second rod passes, wherein, said pair of members are generally in a shape to conform to the shape of the outer surface.

7. The unicycle according to claim 1 wherein the axle of said wheel has disk on each side of said wheel, said disk having a tongue extending from said disk, said tongue connecting said disk to said tines.

8. The unicycle according to claim 7 wherein said tongue has a pair of orifices which mate with orifices on each of said tines and wherein said tongue and tines are held together by a connecting means.

9. The unicycle according to claim 1 wherein the height of said seat is adjustable.

10. The unicycle according to claim 9 wherein said seat is higher in the front and rear than in the center.

11. The unicycle according to claim 1 wherein said tines telescope.

12. The unicycle according to claim 11 wherein said tines have a locking means to hold said tines in an expanded configuration during use.

13. A unicycle according to claim 1 wherein one end of said first rod is separated into two sections which are configured to the outside shape of said second rod and said other end is separated into two sections which are configured to the outside shape of said stem.

14. An improved unicycle comprising a forked stem having a pair of tines each tine having a shock absorber thereon, a wheel rotatably mounted on said tines, a seat connected to said stem, and further comprising a first rod having a pair of ends, one end being connected to said stem and extending rearwardly and upwardly from said stem at an angle of less than 90° and a second rod at other end of the first rod opposite said stem, said second rod having first and second ends said second rod extending in a direction generally parallel to the axle of said unicycle, said second rod having a handle at each of said first and second ends said handles extending toward the front and said unicycle in a direction generally transverse to the direction of said axle said second rod being generally "U" shaped, said first rod having a pair of members between which the second rod passes, wherein said pair of members are generally in a shape to conform to the shape of the outer surface of said second rod, said unicycle having a pair of stabilizer bars extending from opposite sides thereof and in a direction generally transverse to the direction of travel of the wheel of the unicycle said stabilizers not extending sufficiently to touch the ground when said unicycle is in an upright position and wherein said first rod has connected thereto a fore and aft stabilizer, said stabilizer having a wheel at the end that contacts the riding surface.

* * * * *